United States Patent
Zhao et al.

(10) Patent No.: US 10,313,253 B2
(45) Date of Patent: Jun. 4, 2019

(54) NON-BLOCKING REQUEST PROCESSING METHOD AND DEVICE

(71) Applicant: BOE TECHNOLOGY GROUP CO., LTD., Beijing (CN)

(72) Inventors: Junjie Zhao, Beijing (CN); Zhenpeng Guo, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 99 days.

(21) Appl. No.: 15/535,647

(22) PCT Filed: Jun. 15, 2016

(86) PCT No.: PCT/CN2016/085831
§ 371 (c)(1),
(2) Date: Jun. 13, 2017

(87) PCT Pub. No.: WO2017/152535
PCT Pub. Date: Sep. 14, 2017

(65) Prior Publication Data
US 2018/0063005 A1    Mar. 1, 2018

(30) Foreign Application Priority Data

Mar. 7, 2016   (CN) .......................... 2016 1 0127891

(51) Int. Cl.
*H04L 12/855* (2013.01)
*H04W 28/02* (2009.01)
(Continued)

(52) U.S. Cl.
CPC ........ *H04L 47/2466* (2013.01); *H04L 43/106* (2013.01); *H04L 69/28* (2013.01); *H04W 28/02* (2013.01); *H04L 67/12* (2013.01)

(58) Field of Classification Search
USPC ....... 370/252, 349, 389, 236, 278, 290, 350, 370/395.2
See application file for complete search history.

(56) References Cited

U.S. PATENT DOCUMENTS 5,748,959 A * 5/1998 Reynolds .................. G06F 9/52
715/700
5,802,590 A * 9/1998 Draves .................... G06F 9/468
711/163

(Continued)

FOREIGN PATENT DOCUMENTS

| CN | 102446219 A | 5/2012 |
| CN | 102760085 A | 10/2012 |
| CN | 104243405 A | 12/2014 |

OTHER PUBLICATIONS

International Search Report of PCT/CN2016/085831 in Chinese, dated Dec. 12, 2016 with English translation.

(Continued)

*Primary Examiner* — Brenda H Pham
(74) *Attorney, Agent, or Firm* — Collard & Roe, P.C.

(57) ABSTRACT

A non-blocking request processing method and a device. The non-blocking request processing method includes: receiving a non-blocking request from a requestor; determining an execution completion estimated timestamp of the non-blocking request; and sending the execution completion estimated timestamp to the requestor.

18 Claims, 12 Drawing Sheets

(51) Int. Cl.
*H04L 12/26* (2006.01)
*H04L 29/06* (2006.01)
*H04L 29/08* (2006.01)

(56) References Cited

U.S. PATENT DOCUMENTS 6,157,972 A * 12/2000 Newman ........... H04L 12/40071
370/912
2012/0131037 A1 5/2012 Sinha

OTHER PUBLICATIONS

Notice of Transmittal of the International Search Report and Written Opinion of PCT/CN2016/085831 in Chinese, dated Dec. 12, 2016.
Written Opinion of the International Searching Authority of PCT/CN2016/085831 in Chinese, dated Dec. 12, 2016 with English translation.

* cited by examiner

| Request type | Unit instruction execution timestamp | The number of instructions | Task priority | Processor occupancy rate | Memory consumption type | Network occupancy rate | Execution completion timestamp estimation |
|---|---|---|---|---|---|---|---|
| Processor consumption type | a1 microseconds /instruction | a2 instruction | p1->t11 p2->t12 p3->t13 | c1->t21 c2->t22 c3->t23 | | | a1*a2+t1x+t2x |
| Memory consumption type | b1 microseconds /instruction | b2 instruction | p1->t11 p2->t12 p3->t13 | | s1->t31 s2->t32 s3->t33 | | b1*b2+t1x+t3x |
| Network consumption type | c1 microseconds /instruction | c2 instruction | p1->t11 p2->t12 p3->t13 | | | w1->t41 w2->t42 w3->t43 | c1*c2+t1x+t4x |
| Processor and memory consumption type | d1 microseconds /instruction | d2 instruction | p1->t11 p2->t12 p3->t13 | c1->t21 c2->t22 c3->t23 | s1->t31 s2->t32 s3->t33 | | d1*d2+t1x+t2x+t3x |
| Processor and memory consumption type | e1 microseconds /instruction | e2 instruction | p1->t11 p2->t12 p3->t13 | c1->t21 c2->t22 c3->t23 | | w1->t41 w2->t42 w3->t43 | e1*e2+t1x+t2x+t4x |
| Memory and network consumption type | f1 microseconds /instruction | f2 instruction | p1->t11 p2->t12 p3->t13 | | s1->t31 s2->t32 s3->t33 | w1->t41 w2->t42 w3->t43 | f1*f2+t1x+t3x+t4x |
| Processor and memory and network consumption type | g1 microseconds /instruction | g2 instruction | p1->t11 p2->t12 p3->t13 | c1->t21 c2->t22 c3->t23 | s1->t31 s2->t32 s3->t33 | w1->t41 w2->t42 w3->t43 | g1*g2+t1x+t2x+t3x+t4x |

FIG. 7

| Request type | Request operation object | Historical execution completion timestamp | Execution completion timestamp estimation |
|---|---|---|---|
| Create | CSEBase<br>AE<br>remoteAE<br>container<br>...... | t11<br>t12<br>t13<br>t14<br>...... | t11<br>t12<br>t13<br>t14<br>...... |
| Retrieve | CSEBase<br>AE<br>remoteAE<br>container<br>...... | t21<br>t22<br>t23<br>t24<br>...... | t21<br>t22<br>t23<br>t24<br>...... |
| Update | CSEBase<br>AE<br>remoteAE<br>container<br>...... | t31<br>t32<br>t33<br>t34<br>...... | t31<br>t32<br>t33<br>t34<br>...... |
| Delete | CSEBase<br>AE<br>remoteAE<br>container<br>...... | t41<br>t42<br>t43<br>t44<br>...... | t41<br>t42<br>t43<br>t44<br>...... |
| Notify | CSEBase<br>AE<br>remoteAE<br>container<br>...... | t51<br>t52<br>t53<br>t54<br>...... | t51<br>t52<br>t53<br>t54<br>...... |

FIG. 10

| Request type | Request operation object | Historical execution completion timestamp | Execution completion timestamp estimation |
|---|---|---|---|
| Create | CSEBase<br>AE<br>remoteAE<br>container<br>...... | t11<br>t12<br>t13<br>t14<br>...... | Select a longest execution time for creating a request, e.g., t11 |
| Retrieve | CSEBase<br>AE<br>remoteAE<br>container<br>...... | t21<br>t22<br>t23<br>t24<br>...... | Select a longest execution time for retrieving a request, e.g., t21 |
| Update | CSEBase<br>AE<br>remoteAE<br>container<br>...... | t31<br>t32<br>t33<br>t34<br>...... | Select a longest execution time for updating a request, e.g., t31 |
| Delete | CSEBase<br>AE<br>remoteAE<br>container<br>...... | t41<br>t42<br>t43<br>t44<br>...... | Select a longest execution time for deleting a request, e.g., t41 |
| Notify | CSEBase<br>AE<br>remoteAE<br>container<br>...... | t51<br>t52<br>t53<br>t54<br>...... | Select a longest execution time for notifying a request, e.g., t51 |

FIG. 12

NON-BLOCKING REQUEST PROCESSING METHOD AND DEVICE

CROSS REFERENCE TO RELATED APPLICATIONS

This application is the National Stage of PCT/CN2016/085831 filed on Jun. 15, 2016, which claims priority under 35 U.S.C. § 119 of Chinese Application No. 201610127891.6 filed on Mar. 7, 2016, the disclosure of which is incorporated by reference.

TECHNICAL FIELD

The present disclosure relates to a non-blocking request processing method and a device.

BACKGROUND

OneM2M Standards Organization is dedicated to specifying a unified service-level standard oriented to a plurality of Internets of Things. The OneM2M TS-0001 functional architecture defines an overall framework of the protocol and defines three categories of functional entities: an Application Entity (AE), a Common Service Entity (CSE), and a Network Service Entity (NSE). Between the Application Entity (AE) and the Common Service Entity (CSE), between the Common Service Entity (CSE) and the Common Service Entity (CSE), and between the Common Service Entity (CSE) and the Network Service Entity (NSE), interaction is performed through a Request Primitive and a Response Primitive.

According to difference in interactive modes between the request primitive and the response primitive, the OneM2M defines three interactive modes: blocking request, non-blocking request synchronization, and non-blocking request asynchronization. In an interactive process of the non-blocking request synchronization, having received a resource index Req-Ref, a requestor needs to send a request to the resource index Req-Ref multiple times, attempting to retrieve an execution result, and correspondingly, a receiver should send a response of execution uncompleted to the requestor for many times, which, thus, increases workload of the requestor and the receiver, and increases apparatus power consumption of the requestor and the receiver.

SUMMARY

In order to solve the above-described technical problem, the present disclosure proposes a non-blocking request processing method and a device; by determining an execution completion estimated timestamp of a non-blocking request after the receiver receives the non-blocking request, and providing the execution completion estimated timestamp to the receiver, it may be avoided a case where the receiver cannot predict an execution completion timestamp of a request so as to attempt to retrieve an execution result for many times, which thus reduces workload and apparatus power consumption of the requestor and the receiver caused by frequent execution result retrieving request.

An aspect of the present disclosure provides a non-blocking request processing method, applying for the receiver, comprising: receiving a non-blocking request from a requestor; determining an execution completion estimated timestamp of the non-blocking request; and sending the execution completion estimated timestamp to the requestor.

According to an embodiment of the present disclosure, determining of the execution completion estimated timestamp of the non-blocking request includes: determining the execution completion estimated timestamp of the non-blocking request according to a determination strategy of the execution completion estimated timestamp.

According to an embodiment of the present disclosure, the determination strategy of the execution completion estimated timestamp is determined according to at least one of: an indication of the requestor; a current state of the receiver; and an execution parameter of the non-blocking request.

According to an embodiment of the present disclosure, determining of the execution completion estimated timestamp of the non-blocking request according to a determination strategy of the execution completion estimated timestamp, includes: calculating the execution completion estimated timestamp of the non-blocking request according to a predetermined calculation strategy of the execution completion estimated timestamp, the predetermined calculation strategy of the execution completion estimated timestamp being used for calculating the execution completion estimated timestamp according to at least one of a request ideal execution timestamp of the non-blocking request, task priority of the non-blocking request, and receiver load capacity.

According to an embodiment of the present disclosure, the receiver load capacity includes at least one of: a processor occupancy rate, a memory occupancy rate, and a network occupancy rate.

According to an embodiment of the present disclosure, calculating of the execution completion estimated timestamp includes: calculating the execution completion estimated timestamp of the non-blocking request according to the ideal execution timestamp of the non-blocking request, a delay timestamp of the task priority corresponding to the non-blocking request, and a delay timestamp corresponding to the receiver load capacity.

According to an embodiment of the present disclosure, determining of the execution completion estimated timestamp of the non-blocking request according to a determination strategy of the execution completion estimated timestamp, includes: determining the execution completion estimated timestamp of the non-blocking request according to an execution completion timestamp of various categories of historical requests recorded.

According to an embodiment of the present disclosure, determining of the execution completion estimated timestamp of the non-blocking request according to an execution completion timestamp of various categories of historical requests recorded, includes: selecting at least one historical request that matches with the non-blocking request; retrieving a historical execution completion timestamp of the at least one historical request; and determining the execution completion estimated timestamp of the non-blocking request, according to the historical execution completion timestamp of the at least one historical request.

According to an embodiment of the present disclosure, the at least one historical request that matches with the non-blocking request is selected according to a request type of the non-blocking request, or according to the request type and a request operation object of the non-blocking request.

According to an embodiment of the present disclosure, determining of the execution completion estimated timestamp of the non-blocking request, according to the historical execution completion timestamp of the at least one historical request includes: determining a maximum value of the historical execution completion timestamp of the plurality of historical requests as the execution completion estimated timestamp of the non-blocking request.

According to an embodiment of the present disclosure, determining of the execution completion estimated timestamp of the non-blocking request according to a determination strategy of the execution completion estimated timestamp, includes: determining the execution completion estimated timestamp of the non-blocking request received according to the execution completion estimated timestamp of various categories of non-blocking requests.

According to an embodiment of the present disclosure, determining of the execution completion estimated timestamp of the non-blocking request received according to the execution completion estimated timestamp of various categories of non-blocking requests, includes: categorizing the non-blocking request received, according to the request type of the non-blocking request, or according to the request type and the request operation object of the non-blocking request, to determine the request category of the non-blocking request received, and taking the preset execution completion estimated timestamp corresponding to the request category as the execution completion estimated timestamp of the non-blocking request received.

According to an embodiment of the present disclosure, sending of the execution completion estimated timestamp to the requestor, includes: including the execution completion estimated timestamp in a response primitive, and sending the execution completion estimated timestamp to the requestor through the response primitive.

According to an embodiment of the present disclosure, the non-blocking request processing method further comprises: creating a request resource and a resource index after receiving the non-blocking request from the requestor; and sending the resource index to the requestor.

According to an embodiment of the present disclosure, the resource index and the execution completion estimated timestamp are included in a response primitive, and the resource index and the execution completion estimated timestamp are sent to the requestor through the response primitive.

According to an embodiment of the present disclosure, the non-blocking request processing method further comprises: sending the execution result of the non-blocking request to the requestor, after the execution completion estimated timestamp, and after the execution result retrieving request of the non-blocking request from the requestor is received.

Another aspect of the present disclosure provides a non-blocking request processing method, applying to a requester, comprising: sending a non-blocking request to a receiver; and receiving an execution completion estimated timestamp of the non-blocking request from the receiver.

According to an embodiment of the present disclosure, the non-blocking request processing method further comprises: timing the execution completion estimated timestamp, and after completion of the timing of the execution completion estimated timestamp, sending an execution result retrieving request to the receiver.

According to an embodiment of the present disclosure, the receiving an execution completion estimated timestamp of the non-blocking request from the receiver is implemented through a response primitive.

According to an embodiment of the present disclosure, the non-blocking request processing method further comprises: receiving, from the receiver, a resource index of a request resource created for the non-blocking request, the receiving an execution completion estimated timestamp of the non-blocking request from the receiver and the receiving, from the receiver, a resource index of a request resource created for the non-blocking request being both implemented through the response primitive.

Another aspect of the present disclosure provides a non-blocking request processing device, comprising: a request receiving module, configured to receive a non-blocking request from a requestor; a timestamp estimating module, configured to determine an execution completion estimated timestamp of the non-blocking request; and a response module, configured to send the execution completion estimated timestamp to the requestor.

According to an embodiment of the present disclosure, the timestamp estimating module is configured to determine the execution completion estimated timestamp of the non-blocking request according to a determination strategy of the execution completion estimated timestamp.

According to an embodiment of the present disclosure, the timestamp estimating module is configured to determine the determination strategy of the execution completion estimated timestamp according to at least one of: an indication of the requestor; a current state of the receiver; and an execution parameter of the non-blocking request.

According to an embodiment of the present disclosure, the timestamp estimating module is configured to calculate the execution completion estimated timestamp of the non-blocking request according to a predetermined calculation strategy of the execution completion estimated timestamp, the predetermined calculation strategy of the execution completion estimated timestamp being used for calculating the execution completion estimated timestamp according to at least one of a request ideal execution timestamp of the non-blocking request, task priority of the non-blocking request, and receiver load capacity.

According to an embodiment of the present disclosure, the receiver load capacity includes at least one of: a processor occupancy rate, a memory occupancy rate, and a network occupancy rate.

According to an embodiment of the present disclosure, the timestamp estimating module is configured to calculate the execution completion estimated timestamp of the non-blocking request according to the ideal execution timestamp of the non-blocking request, a delay timestamp of the task priority corresponding to the non-blocking request, and a delay timestamp corresponding to the receiver load capacity.

According to an embodiment of the present disclosure, the timestamp estimating module is configured to determine the execution completion estimated timestamp of the non-blocking request according to an execution completion timestamp of various categories of historical requests recorded.

According to an embodiment of the present disclosure, the timestamp estimating module is configured to select at least one historical request that matches with the non-blocking request, retrieve the historical execution completion timestamp of at least one historical request, and determine the execution completion estimated timestamp of the non-blocking request, according to the historical execution completion timestamp of the at least one historical request.

According to an embodiment of the present disclosure, the timestamp estimating module is configured to select the at least one historical request that matches with the non-blocking request, according to a request type and a request operation object of the non-blocking request, or according to the request type of the non-blocking request.

According to an embodiment of the present disclosure, the timestamp estimating module is configured to determine a maximum value of the historical execution completion timestamp of the at least one historical request as the execution completion estimated timestamp of the non-blocking request.

According to an embodiment of the present disclosure, the timestamp estimating module is configured to determine the execution completion estimated timestamp of the non-blocking request received according to the execution completion estimated timestamp of various categories of non-blocking requests.

According to an embodiment of the present disclosure, the timestamp estimating module is configured to categorize the non-blocking request received according to a request type, or according to the request type and a request operation object, to determine the request category of the non-blocking request received, and take the preset execution completion estimated timestamp corresponding to the request category as the execution completion estimated timestamp of the non-blocking request received.

According to an embodiment of the present disclosure, the response module is configured to include the execution completion estimated timestamp to a response primitive, and to send the execution completion estimated timestamp to the requestor through the response primitive.

According to an embodiment of the present disclosure, the non-blocking request processing device further comprises: a resource creating module, configured to create a request resource and a resource index; wherein the response module is configured to send the resource index to the requestor.

According to an embodiment of the present disclosure, the response module is configured to include the resource index and the execution completion estimated timestamp in a response primitive, and send the resource index and the execution completion estimated timestamp to the requestor through the response primitive.

According to an embodiment of the present disclosure, the non-blocking request processing device further comprises: a request executing module, configured to execute the non-blocking request. The request receiving module is further configured to receive an execution result retrieving request from the requestor, the execution result retrieving request being used for retrieving an execution result for the non-blocking request; and the response module is further configured to send the execution result of the non-blocking request to the requestor.

The non-blocking request processing apparatuses and the non-blocking request processing devices according to the embodiments of the present disclosure, by estimating the execution completion estimated timestamp of the non-blocking request after receiving the non-blocking request and sending the estimated execution completion estimated timestamp to the requestor, enables the requestor to roughly understand the expected execution completion timestamp of the non-blocking request, and avoids a case where the requestor continuously sends the execution result retrieving request to attempt to retrieve the execution result. Specifically, the requestor may, after sending the non-blocking request, firstly wait for the execution completion estimated timestamp, and then send the execution result retrieving request to the receiver, so as to avoid the case where the requestor continuously sends the execution result retrieving request to attempt to retrieve the execution result, and reduce the workload and the apparatus power consumption of the requestor and the receiver caused by the frequent execution result retrieving request.

Other features and advantages of the present disclosure will be elaborated hereinafter in the specification, and will be partially obvious from the specification or known by implementing the present disclosure. The objective and other advantages of the present disclosure can be realized and acquired by structures specifically indicated in specification, claims and drawings.

BRIEF DESCRIPTION OF THE DRAWINGS

The embodiments of the present disclosure will be described in detail in connection with the accompanying drawings. The objective, characteristics and advantages of the present disclosure will become more apparent. The drawings are provided for better understanding for the embodiments of the present disclosure, and be part of the specification of the present application and for construing the claimed invention. In the drawings, same reference signs usually denote same components or steps.

FIG. 7 shows a schematic table of calculation of an execution completion estimated timestamp according to some embodiments of the present disclosure;

FIG. 10 shows a schematic table of calculation of an execution completion estimated timestamp according to some embodiments of the present disclosure;

FIG. 12 shows a schematic table of calculation of an execution completion estimated timestamp according to some embodiments of the present disclosure;

DETAILED DESCRIPTION

Figure 1A:
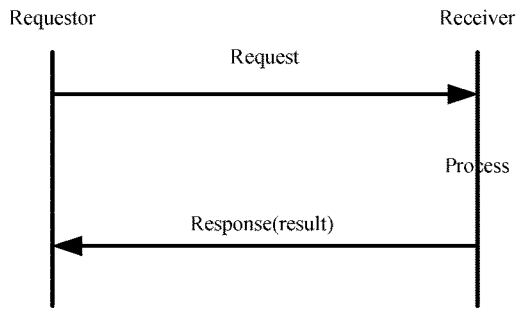
FIG. 1A, FIG. 1B and FIG. 1C respectively show schematic interactive procedures of three interactive modes defined by the OneM2M.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Here, it should be noted that in the drawings, the same reference signs are given to component parts which basically have same or similar structures and functions, and repetitive description about them is omitted.

Figure 1B:
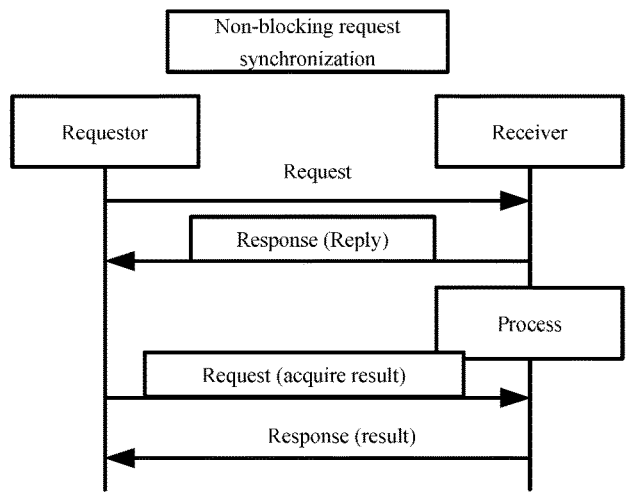
Figure 1C:
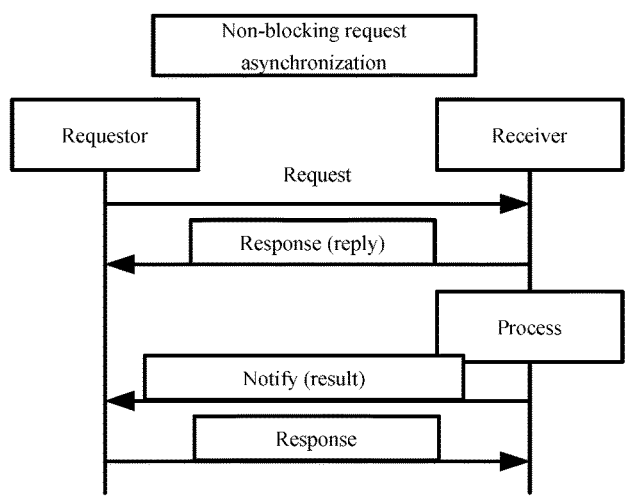

The OneM2M defines three interactive modes: blocking request, non-blocking request synchronization and non-blocking request asynchronization. FIG. 1A, FIG. 1B and FIG. 1C respectively show the three interactive modes, and show difference among the three interactive modes.

As shown in FIG. 1A, the blocking request refers to that after a requestor sends a request, session connection is maintained, until an execution result response sent by a receiver is received. As shown in FIG. 1B, the non-blocking request synchronization refers to that after the requestor sends the request, the receiver immediately sends a response to notify the requestor that the request has been successfully received, then after having received the response message sent by the receiver for a period of time, the requestor initiatively sends a request to the receiver to retrieve an execution result. As shown in FIG. 1C, the non-blocking request asynchronization refers to that, after the requestor sends the request, the receiver immediately sends the response to notify the requestor that the request has been successfully received, then after having completed execution, the receiver sends an execution completion notification carrying the execution result to the requestor. The non-blocking request synchronization and the non-blocking request asynchronization are applicable to different scenarios, the non-blocking request synchronization is applicable to a scenario where the requestor cannot receive a notification message, and the non-blocking request asynchronization is applicable to a scenario where the requestor can receive the notification message.

Figure 2:
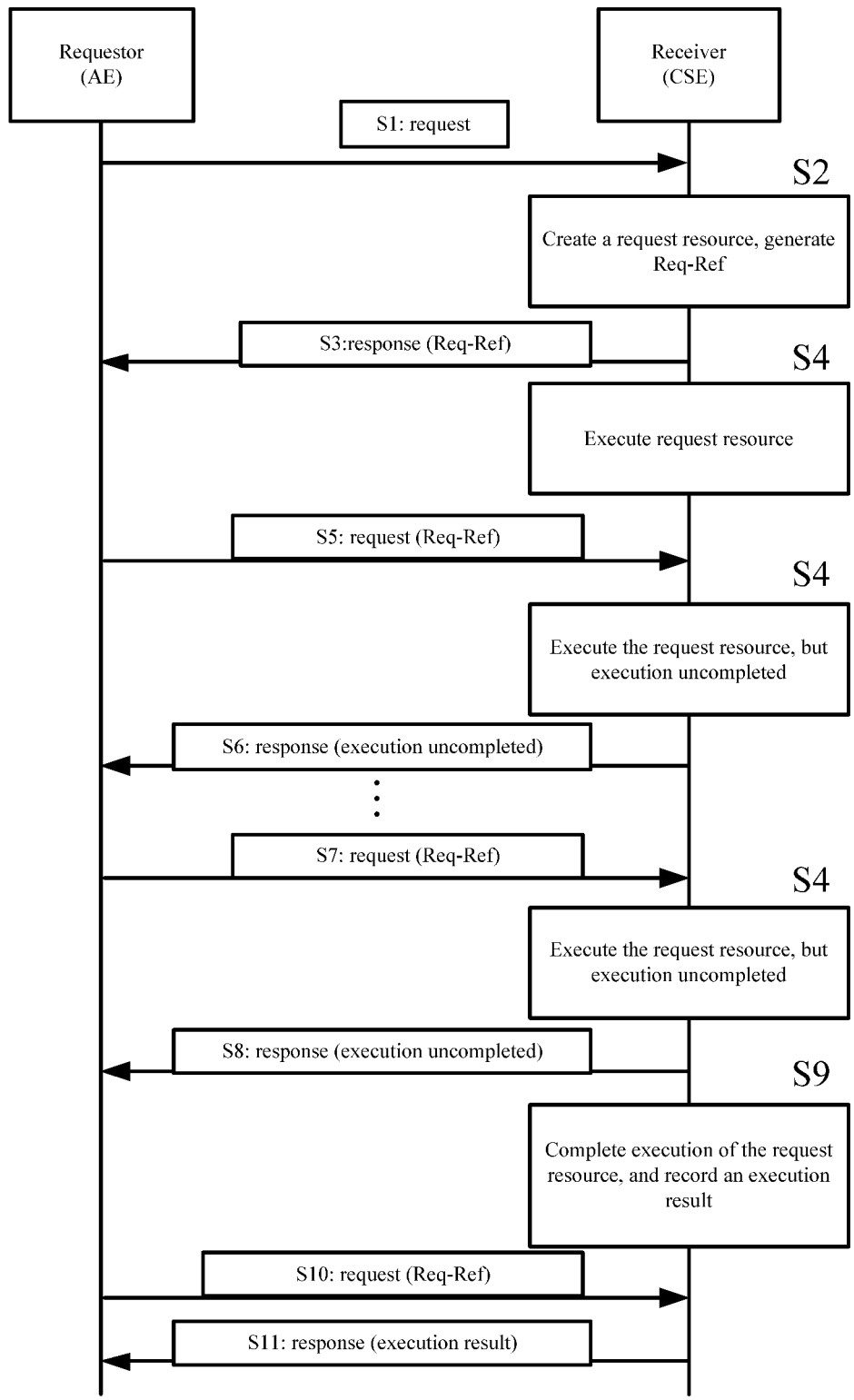
FIG. 2 shows a general interactive process of non-blocking request synchronization.

FIG. 2 shows a general interactive process of the non-blocking request synchronization. Firstly, in step S1, the requestor sends a resource request; in step S2, the receiver creates a request resource, and records detailed information of the resource request in the request resource, and at the same time, creates a resource index Req-Ref; in step S3, the receiver returns the resource index Req-Ref to the requestor; in step S4, the receiver executes the request resource; in step S5, the requestor sends an execution result retrieving request to the resource index Req-Ref; in step S6, since the receiver has not yet completed execution of the non-blocking request, the receiver sends a response of request execution uncompleted to the requestor; in step S7, the requestor, after a period of time, again sends an execution result retrieving request to the resource index Req-Ref; in step S8, since the receiver has not yet completed the execution of the non-blocking request, the receiver sends a response of request execution uncompleted to the requestor; in step S9, the receiver completes execution of the non-blocking request and records the execution result; in step S10, the requestor again sends an execution result retrieving request to the resource index Req-Ref; in step S11, the receiver sends the execution result response to the requestor.

In the interactive process of the non-blocking request synchronization as shown in FIG. 2, after having received the resource index Req-Ref, the requestor cannot predict an execution completion timestamp of the receiver, and needs to send the request attempting to retrieve the execution result to the resource index Req-Ref multiple times, and correspondingly, the receiver should send the response of execution uncompleted to the requestor for many times, so workload of the requestor and the receiver is increased, and apparatus power consumption of the requestor and the receiver is increased.

Therefore, it is necessary that the workload and the apparatus power consumption of the requestor and the receiver caused by frequent execution result retrieving request in the non-blocking request synchronization interactive process can be reduced.

Hereinafter, the non-blocking request processing method according to the embodiment of the present disclosure will be described below from the perspective of the receiver and the requestor, respectively.

Figure 3A:
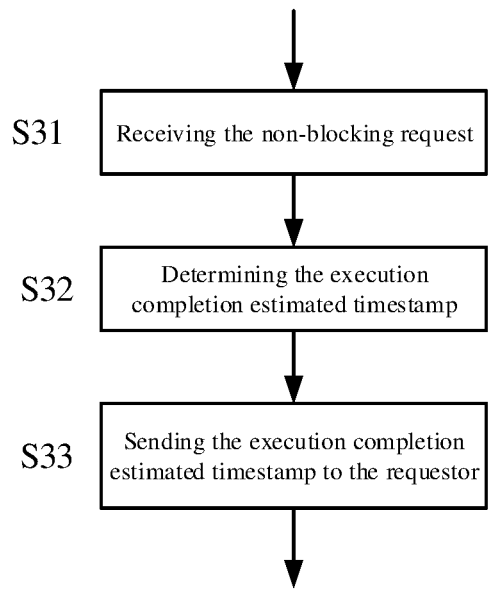
FIG. 3A and FIG. 3B show schematic flow charts of a non-blocking request processing method according to an embodiment of the present disclosure.

Firstly, with reference to FIG. 3A, the non-blocking request processing method according to the embodiment of the present disclosure is described from the perspective of the receiver.

In step S31, the receiver receives the non-blocking request from the requestor.

In step S32, the receiver determines the execution completion estimated timestamp of the non-blocking request.

In step S33, the receiver sends the execution completion estimated timestamp to the requestor.

The execution completion estimated timestamp may be an estimated time point when the receiver completes execution of the non-blocking request, or may be a time period from a time point when the receiver receives the non-blocking request to the estimated time point when the receiver completes the execution of the non-blocking request.

Figure 3B:
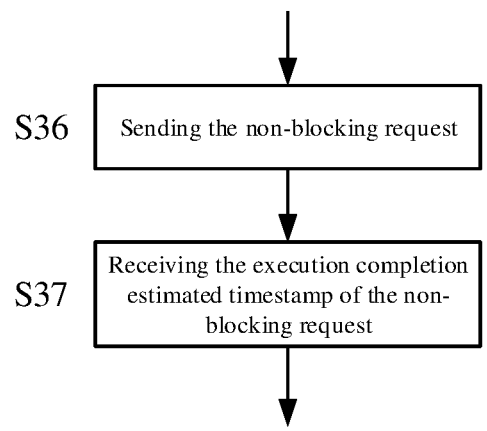

Next, with reference to FIG. 3B, the non-blocking request processing method according to the embodiment of the present disclosure is described from the perspective of the requestor.

In step S36, the requestor sends the non-blocking request to the receiver.

In step S37, the requestor receives the execution completion estimated timestamp of the non-blocking request from the receiver.

In the non-blocking request processing method according to the embodiment of the present disclosure, the execution completion estimated timestamp of the non-blocking request is estimated after receiving the non-blocking request and the estimated execution completion estimated timestamp is sent to the requestor, so that the requestor can roughly understand an expected execution completion timestamp of the non-blocking request, which avoids a case where the requestor continuously sends the execution result retrieving request so as to attempt to retrieve the execution result.

Hereinafter, the interactive process between the requestor and the receiver according to the embodiment of the present disclosure will be described with the OneM2M protocol as an example.

According to the embodiment of the present disclosure, the requestor may be an Application Entity (AE), and the receiver may be a Common Service Entity (CSE); or the requestor may be a Common Service Entity (CSE), and the receiver may be a Common Service Entity (CSE); or the requestor may be a Common Service Entity (CSE), and the receiver may be a Network Service Entity (NSE).

In the present specification, the non-blocking request processing method according to the embodiment of the present disclosure will be described with the requestor being the Application Entity (AE), and the receiver being the Common Service Entity (CSE) as an example.

Figures 4, 5:
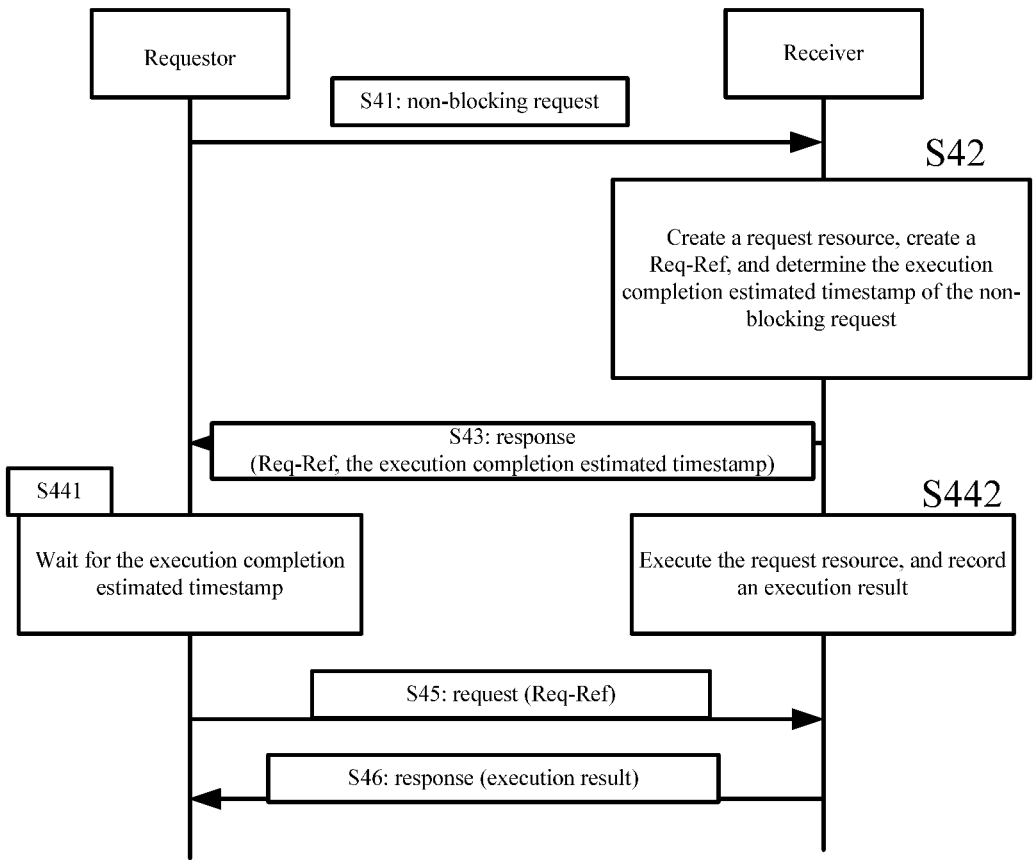
FIG. 4 shows a schematic interactive procedure between a requestor and a receiver according to an embodiment of the present disclosure.
FIG. 5 shows an example of a response parameter sent by the requestor to the receiver according to the embodiment of the present disclosure.

FIG. 4 shows the interactive process between the requestor and the receiver according to the embodiment of the present disclosure.

In step S41, the requestor sends the non-blocking request to the receiver, and the receiver receives the non-blocking request.

In step S42, the receiver determines the execution completion estimated timestamp of the non-blocking request. Optionally, the receiver also creates the request resource, and creates the resource index Req-Ref. In addition, optionally, detailed information of the resource request may also be recorded in the request resource. For example, under the OneM2M protocol, the request resource (<request>) may record relevant information of the non-blocking request, including: the requestor, the receiver, a request ID, a request content, a request status, a request execution result, and so on.

In step S43, the receiver sends the execution completion estimated timestamp of the non-blocking request to the requestor. Optionally, the receiver sends the created resource index Req-Ref and the execution completion estimated timestamp of the non-blocking request to the requestor simultaneously, and the requestor receives the resource index Req-Ref and the execution completion estimated timestamp.

Then, in step S441, the requestor waits for the execution completion estimated timestamp.

At the same time, in step S442, the receiver executes the received non-blocking request and records the execution result.

In step S45, the requestor sends the execution result retrieving request to the receiver, and the receiver receives the execution result retrieving request, the execution result retrieving request being used for retrieving the execution result of the non-blocking request. Optionally, the requestor sends the execution result retrieving request with respect to the resource index Req-Ref to the receiver.

In step S46, the receiver sends the execution result of the non-blocking request to the requestor, and the requestor receives the execution result.

In the non-blocking request processing method according to the embodiment of the present disclosure, the execution completion estimated timestamp of the request is sent to the requestor, the requestor may, after waiting for the execution completion estimated timestamp, sends the execution result retrieving request to the receiver, so as to avoid the case where the requestor continuously sends the execution result retrieving request to attempt to retrieve the execution result, and reduce the workload and the apparatus power consumption of the requestor and the receiver caused by the frequent execution result retrieving request.

It should be understood that, the OneM2M protocol is based on a resource, the receiver creates the request resource and creates the resource index, and then information interaction is performed between the requestor and the receiver through the resource index. However, other protocols to which the non-blocking request is applied may not be based on the resource, in which case, the receiver does not need to create the request resource and create the resource index, that is, in steps S42, S43 and S45, the contents of creation of the request resource and interaction with the resource index are not required, but optional.

FIG. 5 shows a response primitive of the execution completion estimated timestamp of the request provided by the receiver to the requestor according to the embodiment of the present disclosure. According to the embodiment of the present disclosure, a response parameter: Result Estimated Timestamp is added to the response primitive provided by the receiver to the requestor. The result estimated timestamp response parameter is used for indicating a timestamp when the receiver completes the execution of the non-blocking request, and the requestor can retrieve the execution result of the non-blocking request.

As an example, the response primitive further includes at least part of response parameters as follows: Response Status Code, Request Identifier, content (including Req-Ref), To, From, Originating Timestamp, Result Expiration Timestamp, and Event Category.

Figure 6:
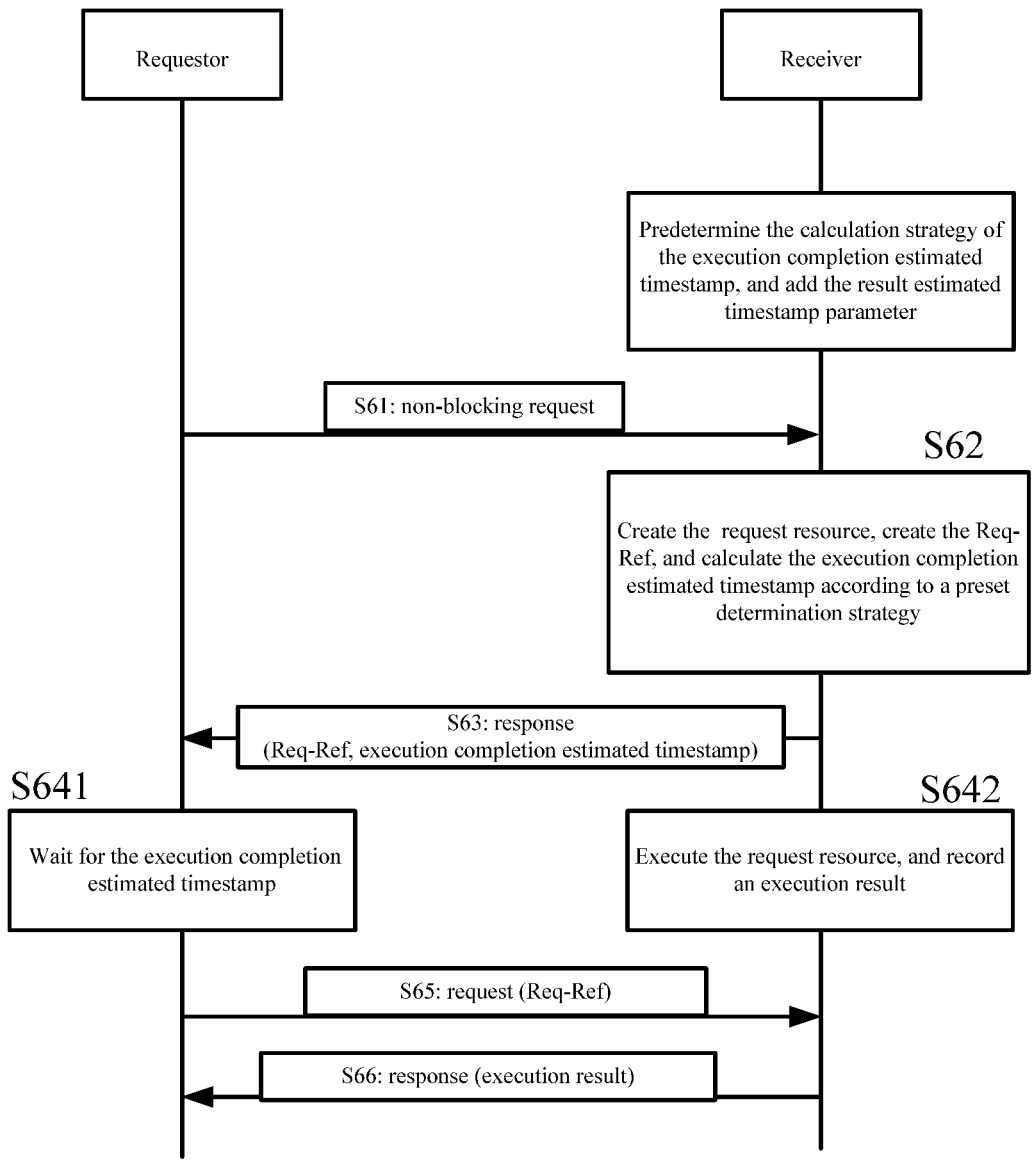
FIG. 6 shows a schematic interactive procedure between a requestor and a receiver according to some embodiments of the present disclosure.

Hereinafter, a non-blocking request processing method according to a first embodiment of the present disclosure will be described with reference to FIG. 6.

According to the first embodiment of the present disclosure, determining of the execution completion estimated timestamp of the non-blocking request according to a determination strategy of the execution completion estimated timestamp, includes: calculating the execution completion estimated timestamp of the non-blocking request according to a predetermined calculation strategy of the execution completion estimated timestamp.

According to the first embodiment of the present disclosure, the calculation strategy of the execution completion estimated timestamp is predetermined at a receiver, and the execution completion estimated timestamp of the non-blocking request is calculated according to the predetermined calculation strategy of the execution completion estimated timestamp.

In step S61, a requestor sends the non-blocking request to the receiver, and the receiver receives the non-blocking request.

In step S62, the receiver calculates the execution completion estimated timestamp of the non-blocking request according to the predetermined calculation strategy of the execution completion estimated timestamp. Optionally, the receiver creates a request resource, and creates a resource index Req-Ref, and may further record detailed information of a resource request in the request resource.

In step S63, the receiver sends the execution completion estimated timestamp of the non-blocking request to the requestor. Optionally, the receiver sends the created resource index Req-Ref to the requestor along with the execution completion estimated timestamp of the non-blocking request, and the requestor receives the resource index Req-Ref and the execution completion estimated timestamp.

Then, in step S641, the requestor waits for the execution completion estimated timestamp. At the same time, in step S642, the receiver executes the non-blocking request and records an execution result.

In step S65, the requestor sends an execution result retrieving request to the receiver, and the receiver receives the execution result retrieving request, the execution result retrieving request being used for retrieving the execution result of the non-blocking request. Optionally, the requestor sends the execution result retrieving request with respect to the resource index Req-Ref to the receiver.

In step S66, the receiver sends the execution result of the non-blocking request to the requestor, and the requestor receives the execution result.

According to the first embodiment of the present disclosure, the predetermined calculation strategy of the execution completion estimated timestamp may take into account at least one of: a request ideal execution timestamp, task priority and receiver load capacity, that is, the execution completion estimated timestamp is calculated by the predetermined calculation strategy of the execution completion estimated timestamp according to at least one of the request ideal execution timestamp, the task priority and the receiver load capacity. Further, according to the first embodiment of the present disclosure, the receiver load capacity may include at least one of: a processor occupancy rate, a memory occupancy rate, and a network occupancy rate.

For example, with respect to each non-blocking request received by the receiver, the non-blocking request may be divided into request types below according to the resource it needs: a processor consumption type, a memory consumption type, a network consumption type, a processor and memory consumption type, a processor and network consumption type, a memory and network consumption type, and a processor and memory and network consumption type.

With respect to the non-blocking request received by the receiver, the ideal execution timestamp of the non-blocking request may be calculated according to the number of instructions of the non-blocking request and a unit instruction execution timestamp.

Preferably, with respect to each non-blocking request, the execution completion estimated timestamp of the non-blocking request may be calculated according to the ideal execution timestamp of the non-blocking request, a delay timestamp of the task priority corresponding to the non-blocking request, and a delay timestamp of the receiver load capacity corresponding to the non-blocking request.

According to the first embodiment of the present disclosure, with respect to non-blocking requests of different request types, specific embodiments of the receiver load capacity are also different.

Specifically, with respect to the non-blocking request of the processor consumption type, the receiver load capacity includes the processor occupancy rate; with respect to the non-blocking request of the memory consumption type, the receiver load capacity includes the memory occupancy rate; with respect to the non-blocking request of the network consumption type, the receiver load capacity includes the network occupancy rate; with respect to the non-blocking request of the processor and memory consumption type, the receiver load capacity includes the processor occupancy rate and the memory occupancy rate; with respect to the non-blocking request of the processor and network consumption type, the receiver load capacity includes the processor occupancy rate and the network occupancy rate; with respect to the non-blocking request of the memory and network consumption type, the receiver load capacity includes the memory occupancy rate and the network occupancy rate; and with respect to the non-blocking request of the processor and memory and network consumption type, the receiver load capacity includes the processor occupancy rate, the memory occupancy rate and the network occupancy rate.

FIG. 7 shows a schematic table of calculation of the execution completion estimated timestamp according to the first embodiment of the present disclosure. It should be noted that: "×" is a multiplication operation symbol, and "+" is an addition operation symbol.

For example, with respect to the non-blocking request of the processor consumption type, the execution completion estimated timestamp may be: unit instruction execution timestamp (a1 microseconds/instruction)×the number of instructions for the non-blocking request (a2 instruction)+delay timestamp corresponding to task priority of the non-blocking request (t1x)+delay timestamp corresponding to a current processor occupancy rate (t2x).

For example, with respect to the non-blocking request of the memory consumption type, the execution completion estimated timestamp may be: unit instruction execution timestamp (b1 microseconds/instruction)×the number of instructions for the non-blocking request (b2 instruction)+delay timestamp corresponding to task priority of the non-blocking request (t1x)+delay timestamp corresponding to a current memory occupancy rate (t3x).

For example, with respect to the non-blocking request of the network consumption type, the execution completion estimated timestamp may be: unit instruction execution timestamp (c1 microseconds/instruction)×the number of instructions for the non-blocking request (c2 instruction)+delay timestamp corresponding to task priority of the non-blocking request (t1x)+delay timestamp corresponding to a current network occupancy rate (t4x).

Figure 8:
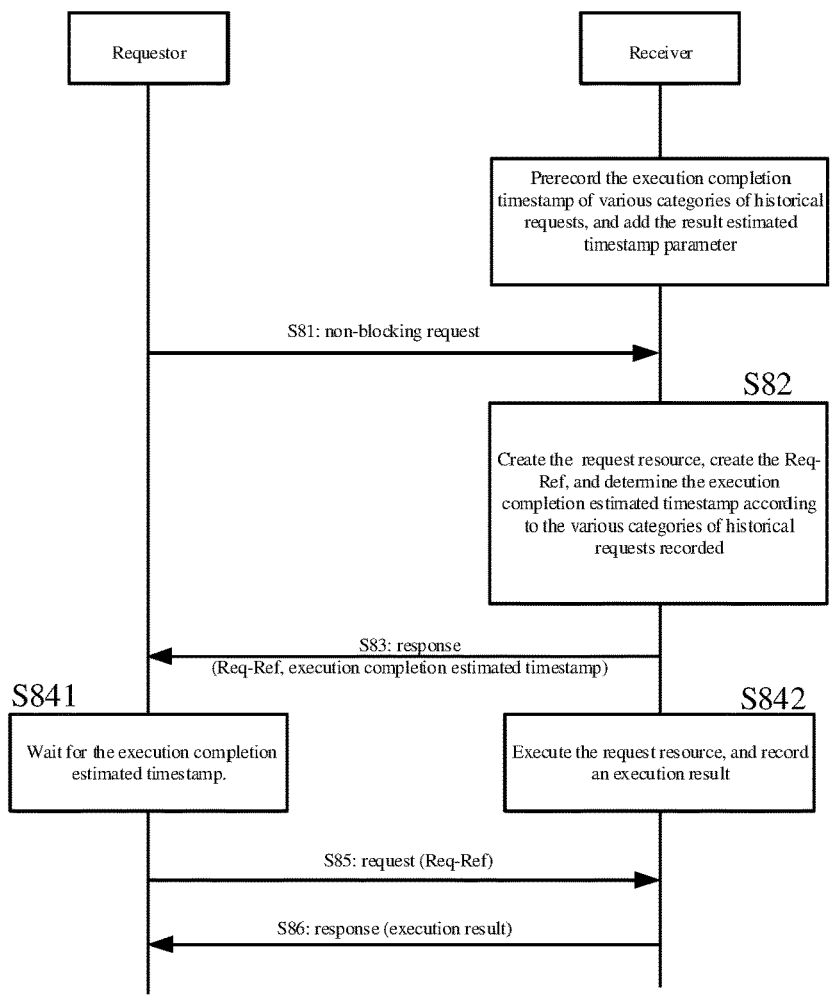
FIG. 8 shows a schematic interactive process flow chart between a requestor and a receiver according to some embodiments of the present disclosure.

Next, a non-blocking request processing method according to a second embodiment of the present disclosure will be described with reference to FIG. 8.

According to the second embodiment of the present disclosure, determining of the execution completion estimated timestamp of the non-blocking request according to a determination strategy of the execution completion estimated timestamp, specifically includes: determining the execution completion estimated timestamp of the non-blocking request received currently according to an execution completion timestamp of various categories of historical requests recorded.

According to the second embodiment of the present disclosure, after having prerecorded the execution completion timestamp of various categories of historical requests, and received the non-blocking request from the requestor, the receiver determines the execution completion estimated timestamp of the non-blocking request received currently according to the execution completion timestamp of various categories of historical requests recorded.

In step S81, the requestor sends the non-blocking request to the receiver, and the receiver receives the non-blocking request.

In step S82, after having received the non-blocking request, the receiver determines the execution completion estimated timestamp of the non-blocking request according to the execution completion timestamp of various categories of historical requests recorded. Optionally, the receiver creates a request resource, and creates a resource index Req-Ref, and may further record detailed information of a resource request in the request resource.

In step S83, the receiver sends the execution completion estimated timestamp of the non-blocking request to the requestor. Optionally, the receiver sends the created resource index Req-Ref to the requestor along with the execution completion estimated timestamp of the non-blocking request, and the requestor receives the resource index Req-Ref and the execution completion estimated timestamp.

Then, in step S841, the requestor waits for the execution completion estimated timestamp. At the same time, in step S842, the receiver executes the non-blocking request and records an execution result.

In step S85, the requestor sends the execution result retrieving request to the receiver, and the receiver receives the execution result retrieving request, the execution result retrieving request being used for retrieving the execution result of the non-blocking request. Optionally, the requestor sends the execution result retrieving request with respect to the resource index Req-Ref to the receiver.

In step S86, the receiver sends the execution result of the non-blocking request to the requestor, and the requestor receives the execution result.

Figure 9:
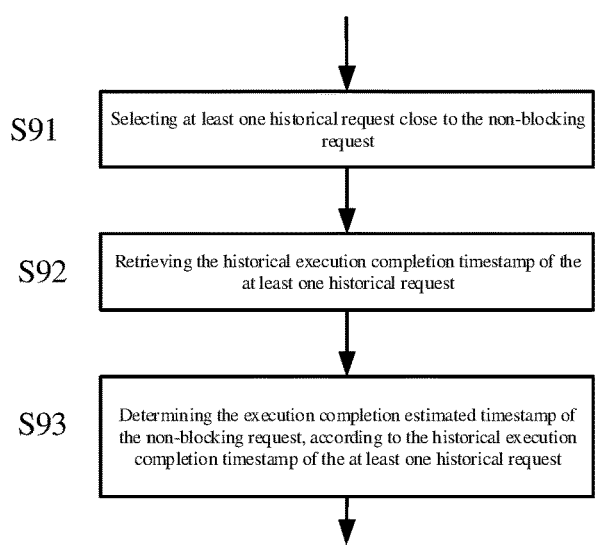
FIG. 9 shows a method for determining an execution completion estimated timestamp of the non-blocking request according to an execution completion timestamp of various categories of historical requests recorded according to some embodiments of the present disclosure.

Hereinafter, the method for determining the execution completion estimated timestamp of the non-blocking request according to the execution completion timestamp of various categories of historical requests recorded according to the second embodiment of the present disclosure will be described with reference to FIG. 9.

Step S91: selecting at least one historical request matching with the non-blocking request.

Optionally, the at least one historical request that matches with the non-blocking request may be selected, according to a request type of the non-blocking request.

Optionally, the at least one historical request that exactly matches with the non-blocking request may be selected, or the at least one historical request that matches with the non-blocking request to a higher degree may be selected, according to the request type and a request operation object of the non-blocking request.

FIG. 10 shows the request type and the request operation object of the various categories of historical requests as well as a historical execution completion timestamp according to the second embodiment of the present disclosure.

For example, according to the OneM2M protocol, the request type of the non-blocking request may include: Create, Retrieve, Update, Delete, and Notify.

For example, according to the OneM2M protocol, the request operation object of the non-blocking request may include: CSEBase, AE, remoteAE, container, and so on.

Step S92: retrieving the historical execution completion timestamp of the at least one historical request.

Step S93: determining the execution completion estimated timestamp of the non-blocking request, according to the historical execution completion timestamp of the at least one historical request.

As shown in FIG. 10, one historical request close to the non-blocking request is selected according to the request type and the request operation object of the non-blocking request, and the historical execution completion timestamp of the historical request is taken as the execution completion estimated timestamp of the non-blocking request.

In addition, for example, when a plurality of historical requests that are close to the non-blocking request are selected according to the request type and the request operation object of the non-blocking request, a maximum value of the historical execution completion timestamp of the plurality of historical requests may be selected as the execution completion estimated timestamp of the non-blocking request; or an average value of the historical execution completion timestamp of the plurality of historical requests may be selected as the execution completion estimated timestamp of the non-blocking request.

For another example, when the plurality of historical requests that are close to the non-blocking request are selected according to the request type of the non-blocking request, the maximum value of the historical execution completion timestamp of the plurality of historical requests may be selected as the execution completion estimated timestamp of the non-blocking request.

Figure 11:
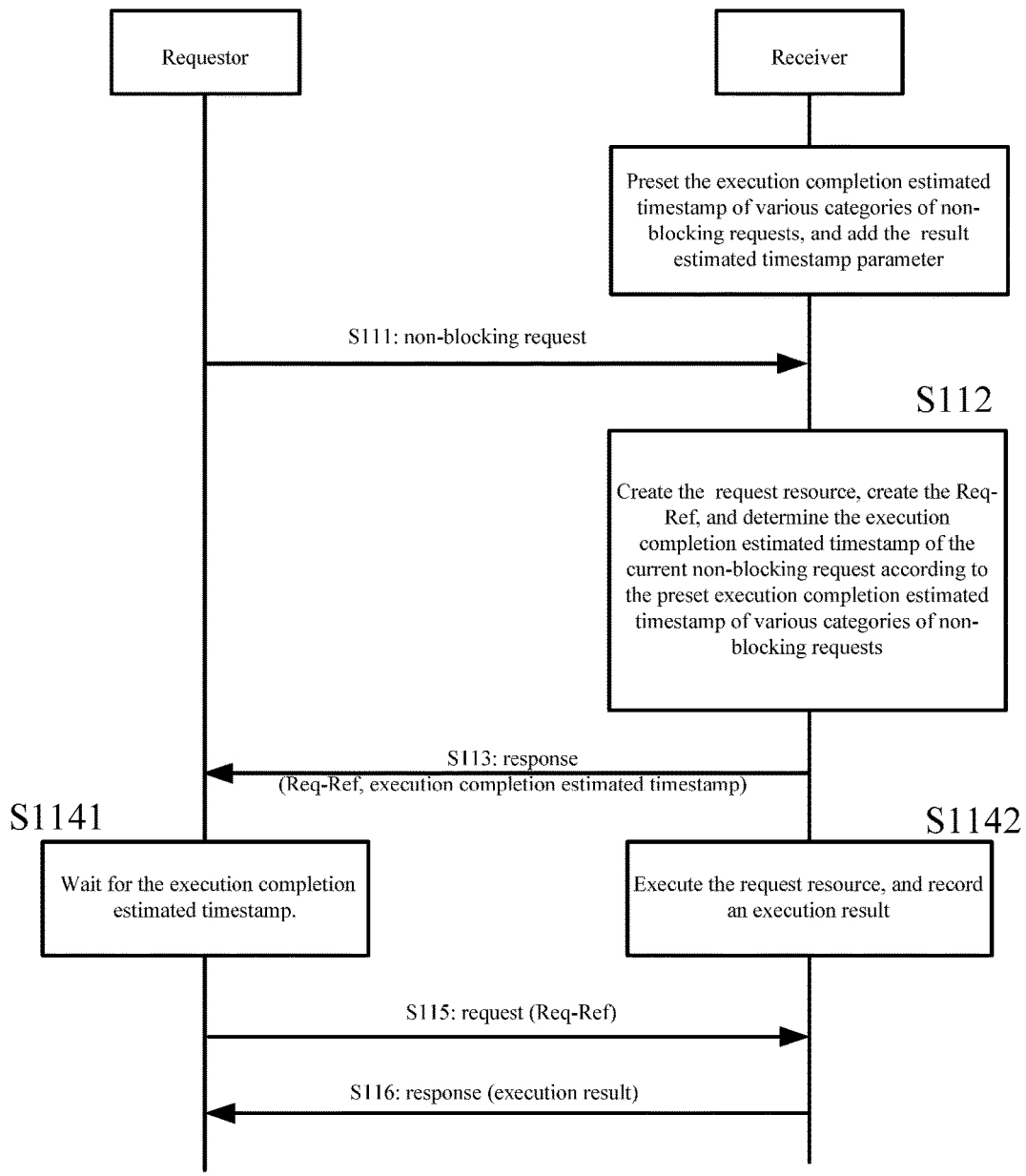
FIG. 11 shows a schematic interactive process flow chart between a requestor and a receiver according to some embodiments of the present disclosure.

Hereinafter, a non-blocking request processing method according to a third embodiment of the present disclosure will be described with reference to FIG. 11.

According to the third embodiment of the present disclosure, determining of the execution completion estimated timestamp of the non-blocking request according to a determination strategy of the execution completion estimated timestamp, includes: determining the execution completion estimated timestamp of the non-blocking request received according to the execution completion estimated timestamp of various categories of non-blocking requests.

According to the third embodiment of the present disclosure, having preset the execution completion estimated timestamp of the various categories of non-blocking requests, and received the non-blocking request from the requestor, the receiver takes the execution completion estimated timestamp of a category of non-blocking requests closest to the non-blocking request received as the execution completion estimated timestamp of the non-blocking request received.

In step S111, the requestor sends the non-blocking request to the receiver, and the receiver receives the non-blocking request.

In step S112, the receiver determines the execution completion estimated timestamp of the non-blocking request received according to the preset execution completion estimated timestamp of the various categories of non-blocking requests. Optionally, the receiver creates a request resource, and creates a resource index Req-Ref, and may further record detailed information of a resource request in the request resource.

For example, the receiver may categorize the non-blocking request received according to the request type, or according to the request type and the request operation object, to determine the request category of the non-blocking request received currently, and takes the preset execution completion estimated timestamp corresponding to the request category as the execution completion estimated timestamp of the non-blocking request received currently.

In step S113, the receiver sends the execution completion estimated timestamp of the non-blocking request to the requestor. Optionally, the receiver sends the created resource index Req-Ref to the requestor along with the execution completion estimated timestamp of the non-blocking request, and the requestor receives the resource index Req-Ref and the execution completion estimated timestamp.

Then, in step S1141, the requestor waits for the execution completion estimated timestamp. At the same time, in step S1142, the receiver executes the non-blocking request and records an execution result. Optionally, in step S1142, the receiver updates the execution completion estimated timestamp of the category corresponding to the non-blocking request according to an actual execution completion timestamp of the non-blocking request.

In step S115, the requestor sends the execution result retrieving request to the receiver, and the receiver receives the execution result retrieving request, the execution result retrieving request being used for retrieving the execution result of the non-blocking request. Optionally, the requestor sends the execution result retrieving request with respect to the resource index Req-Ref to the receiver.

In step S116, the receiver sends the execution result of the non-blocking request to the requestor, and the requestor receives the execution result.

According to the third embodiment of the present disclosure, determining of the execution completion estimated timestamp of the non-blocking request received according to the execution completion estimated timestamp of various categories of non-blocking requests, includes: the receiver may categorize the non-blocking request received according to the request type, or according to the request type and the request operation object. The execution completion estimated timestamp matching with the request category of the non-blocking request is determined from corresponding relationship between the request category and the execution completion estimated timestamp, as the execution completion estimated timestamp of the non-blocking request received.

As described before, according to the request type, the non-blocking request may be divided into: create, retrieve, update, delete, and notify. With respect to each request type, the execution completion estimated timestamp of the request type may be preset, or the execution completion estimated timestamp of the request type may be calculated in real time. For example, with respect to each request type, the execution completion estimated timestamp of the request type may be preset according to the maximum value of the historical execution completion timestamp of respective historical requests of the request type. Or, the maximum value of the historical execution completion timestamp of respective historical requests of the request type may be determined in real time, and the maximum value is taken as the execution completion estimated timestamp.

FIG. 12 shows an example of presetting the execution completion estimated timestamp of the request type for each request type according to the third embodiment of the present disclosure.

Alternatively, as described above, according to the request operation object, each request type may be further divided into a plurality of request sub-types: CSEBase, AE, remoteCSE, container, etc. With respect to each request sub-type, the execution completion estimated timestamp of the request sub-type may be preset according to a maximum value of the historical execution completion timestamp of respective historical requests of the request sub-type. With reference to FIG. 10, t11, t12, . . . t54, etc. may respectively represent maximum historical execution completion timestamps corresponding to the respective request sub-types.

Specifically, after execution of the non-blocking request is completed each time, in a case where the actual execution completion timestamp of the non-blocking request is greater than the preset execution completion estimated timestamp of the request category (i.e., the request type or the request sub-type) corresponding to the non-blocking request, the preset execution completion estimated timestamp of the request category (i.e., the request type or the request sub-type) corresponding to the non-blocking request is updated to the actual execution completion timestamp of the non-blocking request; on the contrary, in a case where the actual execution completion timestamp of the non-blocking request is not greater than the preset execution completion estimated timestamp of the request category (i.e., the request type or the request sub-type) corresponding to the non-blocking request, the preset execution completion estimated timestamp of the request category (i.e., the request type or the request sub-type) corresponding to the non-blocking request remains unchanged.

It should be understood that, the OneM2M protocol is a protocol based on the resource request, the receiver creates the request resource and creates the resource index, and then information interaction is performed between the requestor and the receiver through the resource index. However, other protocols to which the non-blocking request is applied may not be based on the resource request, in which case, the receiver does not need to create a resource and create the resource index, that is to say, from the first embodiment to the third embodiment of the present disclosure, in steps S62, S63, S65, S82, S83, S85, S112, S113, and S115, the contents of creation of the request resource and interaction with the resource index are not required.

Figure 13:
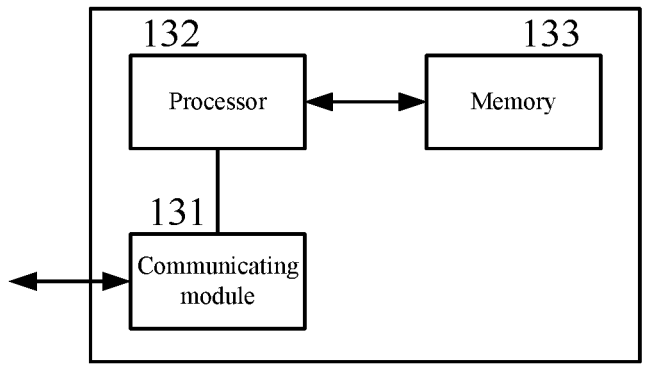
FIG. 13 shows a schematic block diagram of a non-blocking request processing apparatus implemented at a receiver according to some embodiments of the present disclosure.

Hereinafter, a non-blocking request processing apparatus according to an embodiment of the present disclosure will be described with reference to FIG. 13, and the non-blocking request processing apparatus is implemented at a receiver of a non-blocking request.

The non-blocking request processing apparatus according to the embodiment of the present disclosure comprises a communicating module 131, a processor 132, and a memory 133.

The communicating module 131 is configured to perform data communication with a peripheral, so as to receive various categories of requests from the peripheral, for example, receive a task execution request and an execution result retrieving request from a requestor, and sends various categories of response messages to the external, for example, sends a request reception response and an execution result response to the requestor.

The memory 133 is configured to store a program instruction.

The processor 132 is configured to execute the program instruction stored in the memory, so as to perform the above-described non-blocking request processing method according to the embodiment of the present disclosure, and to implement the non-blocking request processing device according to the embodiment of the present disclosure.

Figure 14:
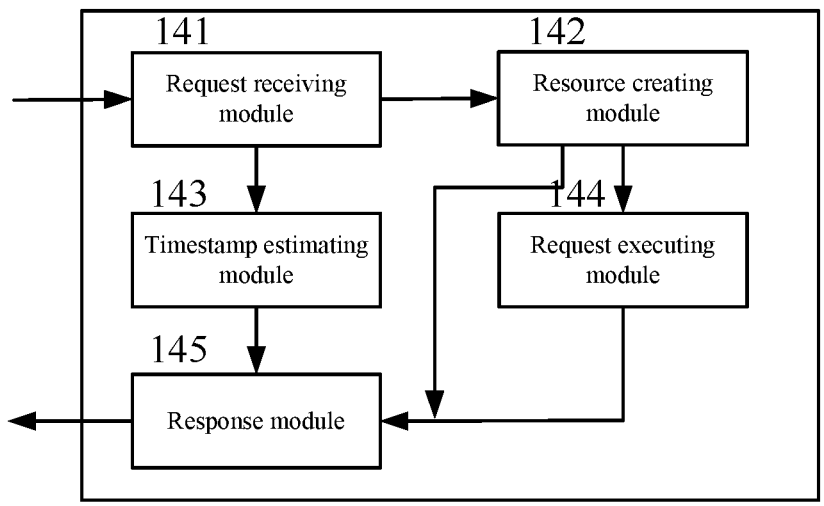
FIG. 14 shows a schematic block diagram of a non-blocking request processing device implemented at a receiver according to some embodiments of the present disclosure.

Hereinafter, a non-blocking request processing device according to an embodiment of the present disclosure will be described with reference to FIG. 14, and the non-blocking request processing device is implemented at a receiver of a non-blocking request.

The non-blocking request processing device may comprise a request receiving module 141, a resource creating module 142, a timestamp estimating module 143, a request executing module 144, and a response module 145.

The request receiving module 141 is configured to receive the non-blocking request, and accordingly execute steps S31, S41, S61, S81 and S111 of the non-blocking request processing methods according to the embodiments of the present disclosure. In addition, the request receiving module 141 is further configured to receive an execution result retrieving request, and accordingly execute steps S45, S65, S85 and S115 of the non-blocking request processing methods according to the embodiments of the present disclosure.

The resource creating module 142 is configured to create a request resource and a resource index Req-Ref for the non-blocking request received by the request receiving module 141, and accordingly execute a portion of steps S42, S62, S82 and S112 of the non-blocking request processing methods according to the embodiments of the present disclosure.

The timestamp estimating module 143 is configured to determine an execution completion estimated timestamp of the non-blocking request, and accordingly execute a portion of steps S42, S62, S82 and S112 of the non-blocking request processing methods according to the embodiments of the present disclosure.

According to the embodiment of the present disclosure, the timestamp estimating module 143 may be configured to determine the execution completion estimated timestamp of the non-blocking request according to a determination strategy of the execution completion estimated timestamp. Optionally, the timestamp estimating module 143 may be configured to determine the determination strategy of the execution completion estimated timestamp according to at least one of: an indication of the requestor; a current state of the receiver; and an execution parameter of the non-blocking request.

According to the embodiment of the present disclosure, the timestamp estimating module 143 may be configured to calculate the execution completion estimated timestamp of the non-blocking request according to a predetermined calculation strategy of the execution completion estimated timestamp (for example, step S62 of the non-blocking request processing method according to the first embodiment of the present disclosure). As described in the first embodiment of the present disclosure, for the predetermined calculation strategy of the execution completion estimated timestamp, at least one of items below may be considered: a request ideal execution timestamp, task priority and receiver load capacity; the receiver load capacity may include at least one of: a processor occupancy rate, a memory occupancy rate, and a network occupancy rate.

According to the embodiment of the present disclosure, the timestamp estimating module 143 may be configured to determine the execution completion estimated timestamp of the non-blocking request according to an execution completion timestamp of various categories of historical requests recorded (for example, step S82 of the non-blocking request processing method according to the second embodiment of the present disclosure). As described in the second embodiment of the present disclosure, the timestamp estimating module 143 may select the at least one historical request close to the non-blocking request, according to a request type of the non-blocking request, or according to a request type and a request operation object of the non-blocking request, and then determine the execution completion estimated timestamp of the non-blocking request according to a historical execution completion timestamp of the at least one historical request. For example, when only one historical request close to the non-blocking request is selected, the historical execution completion timestamp of the historical request is taken as the execution completion estimated timestamp of the non-blocking request. For another example, when a plurality of historical requests that are close to the non-blocking request are selected, a maximum value of the historical execution completion timestamp of the plurality of historical requests may be selected as the execution completion estimated timestamp of the non-blocking request; or an average value of the historical execution completion timestamp of the plurality of historical requests may be selected as the execution completion estimated timestamp of the non-blocking request.

According to the embodiment of the present disclosure, the timestamp estimating module 143 may be configured to determine the execution completion estimated timestamp of the non-blocking request according to a preset execution completion estimated timestamp of various categories of non-blocking requests (for example, step S112 of the non-blocking request processing method according to the third embodiment of the present disclosure). As described in the third embodiment of the present disclosure, the timestamp estimating module 143 may categorize the non-blocking request received according to the request type, or according to the request type and the request operation object, to determine the request category of the non-blocking request received currently, and take the preset execution completion estimated timestamp corresponding to the request category as the execution completion estimated timestamp of the non-blocking request received currently.

The request executing module 144 is configured to execute the non-blocking request, optionally record the execution result, and accordingly perform steps S442, S642, S842 and S1142 of the non-blocking request processing methods according to the embodiments of the present disclosure.

The response module 145 is configured to send the execution completion estimated timestamp to the requestor after the request receiving module 141 receives the non-blocking request and the timestamp estimating module 143 determines the execution completion estimated timestamp, and accordingly execute steps S33, S43, S63, S83 and S113 of the non-blocking request processing methods according to the embodiments of the present disclosure. Preferably, the response module 145 is configured to send a created resource index Req-Ref to the requestor along with the execution completion estimated timestamp, after the request receiving module 141 receives the non-blocking request, the resource creating module 142 creates the request resource and creates the resource index Req-Ref, and the timestamp estimating module 143 determines the execution completion estimated timestamp, and accordingly execute steps S43, S63, S83 and S113 of the non-blocking request processing methods according to the embodiments of the present disclosure.

In addition, the response module 145 is further configured to send the execution result of the non-blocking request to the requestor, after the request receiving module 141 receives the execution result retrieving request and the request executing module 144 completes execution of the non-blocking request, and accordingly execute steps S46, S66, S86 and S116 of the non-blocking request processing methods according to the embodiments of the present disclosure.

Figure 15:
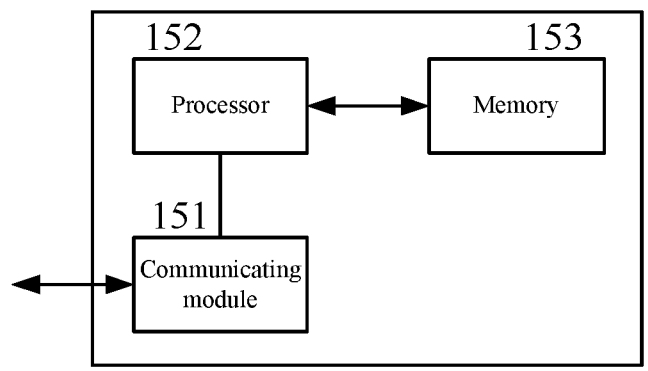
FIG. 15 shows a schematic block diagram of a non-blocking request processing apparatus implemented at a requestor according to some embodiments of the present disclosure.

Hereinafter, a non-blocking request processing apparatus according to an embodiment of the present disclosure will be described with reference to FIG. 15, and the non-blocking request processing apparatus is implemented at a requestor of a non-blocking request.

The non-blocking request processing apparatus according to the embodiment of the present disclosure comprises a communicating module 151, a processor 152 and a memory 153.

The communicating module 151 is configured to perform data communication with a peripheral, so as to send various categories of requests to a receiver and receive various categories of responses from the receiver, for example, send the non-blocking request to the receiver, receive a request reception response from the receiver, send an execution result retrieving request to the receiver, and receive an execution result response from the receiver.

The memory 153 is configured to store a program instruction.

The processor 152 is configured to execute the program instruction stored in the memory, so as to perform the above-described non-blocking request processing method according to the embodiment of the present disclosure, and to implement the non-blocking request processing device according to the embodiment of the present disclosure.

Figure 16:
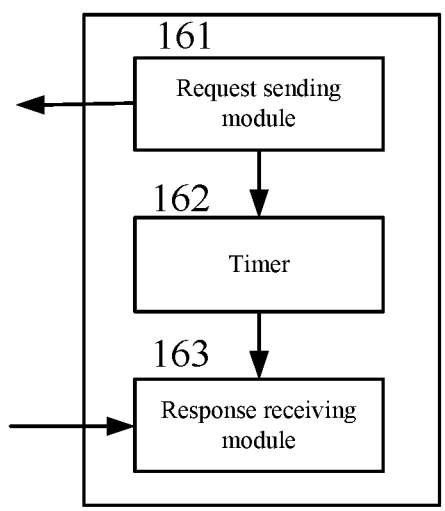
FIG. 16 shows a schematic block diagram of a non-blocking request processing device implemented at a requestor according to some embodiments of the present disclosure.

Hereinafter, a non-blocking request processing device according to an embodiment of the present disclosure will be described with reference to FIG. 16, and the non-blocking request processing device is implemented at a requestor of a non-blocking request.

The non-blocking request processing device may comprise a request sending module 161, a timer 162, and a response receiving module 163.

The request sending module 161 is configured to send the non-blocking request to the receiver.

The response receiving module 163 is configured to receive the execution completion estimated timestamp of the non-blocking request from the receiver.

The timer 162 is configured to time the execution completion estimated timestamp.

After the timer 162 completes timing of the execution completion estimated timestamp, the request sending module 161 sends an execution result retrieving request to the receiver. Then, the response receiving module 163 receives the execution result of the non-blocking request from the receiver.

The non-blocking request processing apparatuses and the non-blocking request processing devices according to the embodiments of the present disclosure, by estimating the execution completion estimated timestamp of the non-blocking request after receiving the non-blocking request and sending the estimated execution completion estimated timestamp to the requestor, enables the requestor to roughly understand the expected execution completion timestamp of the non-blocking request, and avoids a case where the requestor continuously sends the execution result retrieving request to attempt to retrieve the execution result. Specifically, the requestor may, after sending the non-blocking request, firstly wait for the execution completion estimated timestamp, and then send the execution result retrieving request to the receiver, so as to avoid the case where the requestor continuously sends the execution result retrieving request to attempt to retrieve the execution result, and reduce the workload and the apparatus power consumption of the requestor and the receiver caused by the frequent execution result retrieving request.

In addition, according to an embodiment of the present disclosure, there is also provided a computer readable storage medium, having a computer program code stored thereon, which, when the computer program code is run by a computer or a processor, implements the above-described non-blocking request processing device according to the embodiment of the present disclosure and executes the above-described non-blocking request processing method according to the embodiment of the present disclosure.

The respective embodiments of the present disclosure have been described in detail above. However, those skilled in the art should understand that these embodiments can be subjected to various modifications, combinations or sub combinations without departing from the principle and spirit of the present disclosure, and such modifications should fall into the scope of the present disclosure.

The application claims priority to the Chinese patent application No. 201610127891.6, entitled "non-blocking request processing method and device", filed Mar. 7, 2016, the entire disclosure of which is incorporated herein by reference as part of the present application.

What is claimed is:

1. A non-blocking request processing method, comprising:
   receiving a non-blocking request from a requestor;
   determining an execution completion estimated timestamp indicating the normal completion time of the non-blocking request according to a determination strategy of the execution completion estimated timestamp; and
   sending the execution completion estimated timestamp to the requestor,
   wherein determining of the execution completion estimated timestamp indicating the normal completion time of the non-blocking request according to a determination strategy of the execution completion estimated timestamp, includes:
   determining the execution completion estimated timestamp of the non-blocking request received according to the execution completion estimated timestamp of various categories of non-blocking requests.

2. The non-blocking request processing method according to claim 1, wherein the determination strategy of the execution completion estimated timestamp is determined according to at least one of:
   an indication of the requestor;
   a current state of the receiver; and
   an execution parameter of the non-blocking request.

3. The non-blocking request processing method according to claim 1, wherein determining of the execution completion estimated timestamp of the non-blocking request according to a determination strategy of the execution completion estimated timestamp, includes:
   calculating the execution completion estimated timestamp of the non-blocking request according to a predetermined calculation strategy of the execution completion estimated timestamp, the predetermined calculation strategy of the execution completion estimated timestamp being used for calculating the execution completion estimated timestamp according to at least one of a request ideal execution timestamp of the non-blocking request, task priority of the non-blocking request, and receiver load capacity.

4. The non-blocking request processing method according to claim 3, wherein the receiver load capacity includes at least one of: a processor occupancy rate, a memory occupancy rate, and a network occupancy rate.

5. The non-blocking request processing method according to claim 4, wherein calculating of the execution completion estimated timestamp includes:
   calculating the execution completion estimated timestamp of the non-blocking request according to the ideal execution timestamp of the non-blocking request, a delay timestamp of the task priority corresponding to the non-blocking request, and a delay timestamp corresponding to the receiver load capacity.

6. The non-blocking request processing method according to claim 1, wherein determining of the execution completion estimated timestamp of the non-blocking request according to a determination strategy of the execution completion estimated timestamp, includes:
   determining the execution completion estimated timestamp of the non-blocking request according to an execution completion timestamp of various categories of historical requests recorded.

7. The non-blocking request processing method according to claim 6, wherein determining of the execution completion estimated timestamp of the non-blocking request according to an execution completion timestamp of various categories of historical requests recorded, includes:
  selecting at least one historical request that matches with the non-blocking request;
  retrieving a historical execution completion timestamp of the at least one historical request; and
  determining the execution completion estimated timestamp of the non-blocking request, according to the historical execution completion timestamp of the at least one historical request.

8. The non-blocking request processing method according to claim 7, wherein the at least one historical request that matches with the non-blocking request is selected according to a request type of the non-blocking request, or according to the request type and a request operation object of the non-blocking request.

9. The non-blocking request processing method according to claim 7 wherein determining of the execution completion estimated timestamp of the non-blocking request, according to the historical execution completion timestamp of the at least one historical request includes:
  determining a maximum value of the historical execution completion timestamp of the plurality of historical requests as the execution completion estimated timestamp of the non-blocking request.

10. The non-blocking request processing method according to claim 1, wherein determining of the execution completion estimated timestamp of the non-blocking request received according to the execution completion estimated timestamp of various categories of non-blocking requests, includes:
  categorizing the non-blocking request received, according to the request type of the non-blocking request, or according to the request type and the request operation object of the non-blocking request, to determine the request category of the non-blocking request received, and taking the preset execution completion estimated timestamp corresponding to the request category as the execution completion estimated timestamp of the non-blocking request received.

11. The non-blocking request processing method according to claim 1, wherein,
  sending of the execution completion estimated timestamp to the requestor, includes: including the execution completion estimated timestamp in a response primitive, and sending the execution completion estimated timestamp to the requestor through the response primitive.

12. The non-blocking request processing method according to claim 1, further comprising:
  creating a request resource and a resource index after receiving the non-blocking request from the requestor; and
  sending the resource index to the requestor.

13. The non-blocking request processing method according to claim 12, wherein
  the resource index and the execution completion estimated timestamp are included in a response primitive, and the resource index and the execution completion estimated timestamp are sent to the requestor through the response primitive.

14. The non-blocking request processing method according to claim 1, further comprising:
  sending the execution result of the non-blocking request to the requestor, after the execution completion estimated timestamp, and after the execution result retrieving request of the non-blocking request from the requestor is received.

15. A non-blocking request processing method, comprising:
  sending a non-blocking request to a receiver; and
  receiving an execution completion estimated timestamp indicating the normal completion time of the non-blocking request determined according to a determination strategy of the execution completion estimated timestamp from the receiver,
  wherein the execution completion estimated timestamp of the non-blocking request received is determined according to the execution completion estimated timestamp of various categories of non-blocking requests.

16. The non-blocking request processing method according to claim 15, further comprising:
  timing the execution completion estimated timestamp, and after completion of the timing of the execution completion estimated timestamp, sending an execution result retrieving request to the receiver.

17. The non-blocking request processing method according to claim 15, wherein,
  the receiving an execution completion estimated timestamp of the non-blocking request from the receiver is implemented through a response primitive.

18. The non-blocking request processing method according to claim 15, further comprising:
  receiving, from the receiver, a resource index of a request resource created for the non-blocking request, the receiving an execution completion estimated timestamp of the non-blocking request from the receiver and the receiving, from the receiver, a resource index of a request resource created for the non-blocking request being both implemented through the response primitive.

* * * * *